United States Patent
Myers et al.

(10) Patent No.: US 6,246,572 B1
(45) Date of Patent: Jun. 12, 2001

(54) USE OF A BEZEL WALL AS A LOCKING DEVICE

(75) Inventors: Robert Andrew Myers, Cary; Jeff David Thomas, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,575

(22) Filed: Jan. 4, 2000

(51) Int. Cl.$^7$ ........................................................ G06F 1/16
(52) U.S. Cl. ........................ 361/683; 361/724; 312/223.1; 248/551
(58) Field of Search ............................. 361/683, 724–727, 361/684–686, 740, 759; 312/223.1–223.6; 70/14; 248/551–553

(56) References Cited

U.S. PATENT DOCUMENTS

| | | | |
|---|---|---|---|
| 4,918,952 | 4/1990 | Lakoski et al. | 70/51 |
| 5,146,769 | * 9/1992 | Smith | 70/14 |
| 5,305,621 | 4/1994 | Broadwater | 70/14 |
| 5,446,618 | 8/1995 | Tetsuya et al. | 361/683 |
| 5,687,592 | 11/1997 | Penniman et al. | 70/14 |
| 5,816,672 | 10/1998 | LaPointe et al. | 312/223.2 |
| 6,015,195 | * 1/2000 | Anderson et al. | 312/223.1 |
| 6,064,568 | * 5/2000 | Schmitt | 361/683 |

* cited by examiner

*Primary Examiner*—Leo P. Picard
*Assistant Examiner*—Hung Van Duong
(74) *Attorney, Agent, or Firm*—John D Flynn; Winstead, Sechrest & Minick, LLP

(57) ABSTRACT

A computer cover and data drive locking system utilizing a bezel wall of the type for selectively locking the computer cover to the chassis, locking the cover and external access to at least one data drive, and unlocking the cover from the chassis and allowing access to the data drives is provided. The locking system including: an actuatable lock connected to a computer chassis having a cam connected thereto; a bezel surrounding at least a portion of a first data drive mechanism, the bezel having a movable wall; a cover; and a cam follower movably connected to the chassis so as to be in functional connection with the cam, the cam follower having a first end connected to the movable wall and a second end connectable to the cover; wherein the lock is movable between a position interconnecting the cover to the chassis via the cam follower second end, a position interconnecting the cover and the chassis and disposing the movable wall into a position preventing access to the first data drive, and a position where the cam follower second end is disconnected from the cover and the movable wall is disposed away from the access to the first data drive.

31 Claims, 6 Drawing Sheets

USE OF A BEZEL WALL AS A LOCKING DEVICE

TECHNICAL FIELD

The present invention relates in general to computer security systems, and in particular, to a locking mechanism which may selectively secure the cover and access to at least one computer drive mechanism utilizing a bezel wall, or release the cover and allow access to the computer drive mechanism.

BACKGROUND INFORMATION

A computer comprises an electronic housing which includes a chassis in which internal components and external components are secured. Internal components include, but are not limited to, microprocessors, co-processors, circuit boards, and power supplies. The external components include, but are not limited to, data drives and the media in the data drives such as CD-ROM and disks. Commonly, the chassis and the associated internal and external components are enclosed by a bezel and a cover. The bezel is connected to the chassis about the data drives to provide access for insertion and ejection of media. The cover is commonly connected to the chassis by conventional screws so as to enclose and protect the electronic components from dust and other undesirable material.

While the electronic housing provides protection from environmental dangers, such as, dust, and spilled fluids, it does little to limit access to the internal components of the computer by unauthorized individuals and provides no limitation on access to the data drives. Due to the problems of data theft, data destruction, and the introduction of computer viruses among other unauthorized uses of computers it is desirable to limit access to the internal components as well as the external drives and media in the data drives.

Heretofore it has been well known to lock the cover to the chassis to limit unauthorized access to the internal components of the computer. One common method is to provided a rotatable key actuated lock interconnected between the cover and the chassis. Another common method is to have one tab extending to the exterior of the housing from the chassis aligned with a second tab connected to the cover which may be interlocked with the first tab via a padlock. Although these means do limit access to the internal components of the computer, they do not limit the insertion or removal of media from the external data drives.

Other devices have been provided to prevent the removal of removable drives, disks from data drives, memo cards and the like. Several of these prior art locking devices completely prohibit use of the computer as opposed to merely limiting access to the drive slots. It is common for these prior art locking devices to be separate from the computer assembly resulting in the loss of the locking device and thus negating any security measures. Additionally, these attachable locking devices are bulky and cumbersome resulting in the failure to be utilized.

It would be a benefit, therefore, to have a locking device utilizing a bezel wall which is capable of locking the computer cover, locking the computer cover and utilizing a bezel wall to prevent access to a computer drive mechanism, and releasing the cover and allowing access to the computer drive mechanisms. It would be a further benefit to have a locking device utilizing a bezel wall which is compact and low profile. It would be a still further benefit to have a locking device utilizing a bezel wall which allows operation of the computer while preventing the removal or insertion of media in the data drives.

SUMMARY OF THE INVENTION

It is thus an object of this invention to provide a computer locking device utilizing a bezel wall which is movable between locking positions, in which the computer cover may be locked to the chassis, in which the cover my be locked to the chassis and wherein external access to at least one data drive is limited, and a position in which the cover is not locked to the chassis and where external access to the data drive(s) is permitted.

It is a further object of this invention to utilize a bezel wall for limiting external access to a data drive.

It is a still further object of this invention to provide a compact and low profile locking assembly.

It is a still further object of this invention to provide a locking assembly which may lock various components of a computer while still allowing operation of the computer hard drive.

Accordingly, a computer cover and data drive locking system of the type for selectively locking the computer cover to the chassis, locking the cover and external access to at least one data drive, and unlocking the cover from the chassis and allowing access to the data drives is provided. The locking system includes an actuatable lock connected to a computer chassis having a cam connected thereto, a bezel surrounding at least a portion of a first data drive mechanism, the bezel having a movable wall, a cover, and a cam follower movably connected to the chassis so as to be in functional connection with the cam, the cam follower having a first end connected to the movable wall and a second end connectable to the cover; wherein the lock is movable between a position interconnecting the cover to the chassis via the cam follower second end, a position interconnecting the cover and the chassis and disposing the movable wall into a position preventing access to the first data drive, and a position where the cam follower second end is disconnected from the cover and the movable wall is disposed away from the access to the first data drive.

The locking assembly includes a linking arm connected between the first end of the cam follower and the movable bezel wall. A tensioning member, such as a spring, is connected between the linking arm and the chassis to urge the arm and connected bezel wall into a position in which external access to the first data drive mechanism is not blocked. The first cam follower end may have a slot formed in which an end of the linking arm is disposed in connecting to the cam follower. The slot allows the linking arm to slip in relation to the cam follower as the cam follower moves between the cover-only locked position and the fully unlocked position.

The second end of the cam follower is adapted for securing the cover to the computer chassis via the cam follower. The cam follower has a lip or locking surface extending therefrom which extends across a surface of a protrusion extending from the interior of the cover when the locking apparatus is in a cover locking position. The interlocking or engaging surfaces of the cam follower and the cover may take many configurations. Another embodiment would include a locking surface such as a pin extending from the second cam follower end engageable with a cylinder formed by the protrusion of the cover.

The locking system may lock both the cover to the chassis and limit external access to at least one data drive. As shown in more detail in the description below the locking system may limit access to two or more data drive systems.

In a common desk top or tower computer configuration, the computer includes at least a CD-ROM drive and a floppy disk drive. Both data drives and the cover can be secured. For example the second end of the cam follower may have a locking member or tab connected thereto which moves with the cam follower. When the locking apparatus is in the fully locked position the second end of the cam follower is position so that the locking member is position in a position obstructing and limiting access to the floppy drive. When the locking apparatus is in the fully unlocked or cover-only locked position the locking tab is moved to a position so has not to obstruct access to a data drive.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
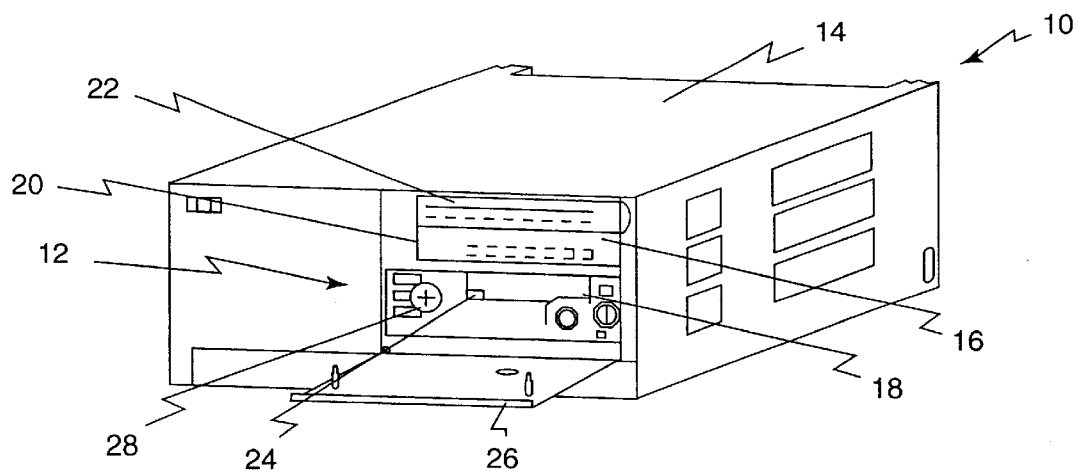
FIG. 1 is a perspective view of a computer having a locking device utilizing a bezel wall of the present invention.

Refer now to the drawings wherein depicted elements are not necessarily shown to scale and wherein like or similar elements are designated by the same reference numeral through the several views.

FIG. 1 is a perspective view of a computer 10 having a locking device utilizing a bezel wall of the present invention, generally designated by the numeral 12. Computer 10 includes a cover 14, CD-ROM drive 16, disk drive 18, CD-ROM bezel 20, bezel wall 22, a locking tab 24, and a door 26.

Cover 14 is constructed of hard, sturdy material, such as a hard plastic or metal. Cover 14 is typically connected to a chassis 30 (FIG. 2) by sliding along side rails 31 (FIG. 2) of chassis 30 until a spring latch (not shown) which is well known in the art is engaged enclosing the internal electronics, not shown, such as but not limited to, microprocessors, co-processors, circuit boards, and power supplies. Cover 14 protects the internal components from dust and other undesired material, and with cover 14 in the fully locked or cover-only locked position prevents unauthorized access to the internal components. A door 26 may be provided to cover drives 16, 18, a power switch and the like.

Locking device 12 includes a lock plug 28, bezel wall 22 and lock tab 24. Lock plug 28 is a key actuated, rotatable lock. The key access to lock plug 28 is positioned so as to be substantially flush with a portion of cover 14 providing a compact, low profile locking mechanism. Lock plug 28 may be rotated between a fully locked position, whereby cover 14 is secured to chassis 30 (FIG. 2), and access to drives 16 and 18 is prevented, to a cover-only locked position, whereby, access to drives 16 and 18 is permitted and cover 14 may not be removed, to a fully unlocked position, whereby, cover 14 may be removed from chassis 30 and access is permitted to drives 16 and 18.

Figure 2:
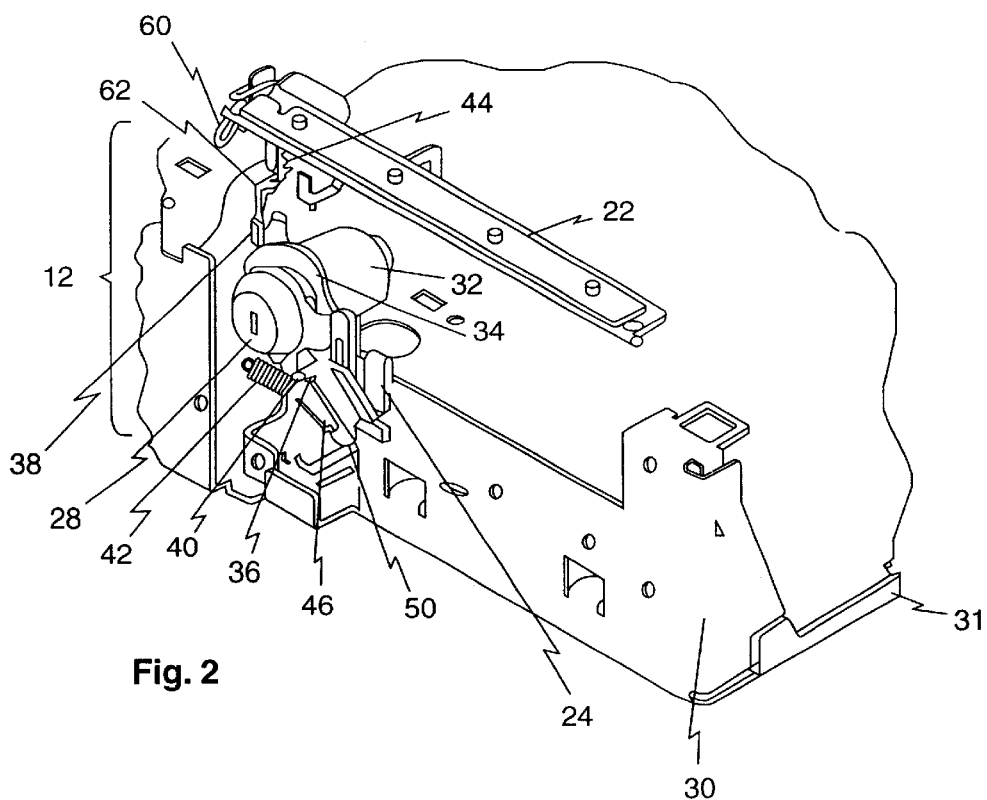
FIG. 2 is a cut-away view of the computer chassis and the locking device utilizing a bezel wall of the present invention.

As shown in FIG. 1, locking device 12 is in the fully locked position with bezel wall 22 in the down position preventing access to CD-ROM 16, locking tab 24 is in the up position preventing access to disk drive 18, and cover 14 is locked to chassis 30 (FIG. 2). With locking device 12 in this position an operator may still utilize computer 10, however, media may not be inserted into or removed from external components 16 and 18.

FIG. 2 is a cut-away view of computer 10 of FIG. 1 showing a portion of chassis 30 and locking device utilizing a bezel wall 12 of the present invention in isolation. As shown, cover 14, drives 16 and 18, and CD-ROM bezel 20, less bezel wall 22 have been removed for clarity.

Locking device 12 includes lock plug 28 having a rotating housing 32, a cam 34, a cam follower 36, locking tab 24, a locking arm 38, and bezel wall 22. Lock plug or cylinder 28, is may be a key actuated, rotating lock assembly which is connected to chassis 30 in a manner such that the key lock is accessible through cover 14 as shown in FIG. 1. In functional connection with lock plug 28 is cam follower 36 which is pivotally connected to chassis 30. By functionally connected it is meant that when lock plug 28 and cam 34 are rotated, cam 34 contacts cam follower 36 changing the orientation of cam follower 36.

Lock plug 28 includes a rotatable lock housing 32 which carries cam 34, so that cam 34 rotates with housing 32 when lock plug 28 is actuated with a key. Cam follower 36 is movably connected to chassis 30 at pivot pin 40, adjacent to lock plug 28 so as to be in operational contact with cam 34. Locking arm 38 is in connection between cam follower 36 and bezel wall 22.

Figure 3:
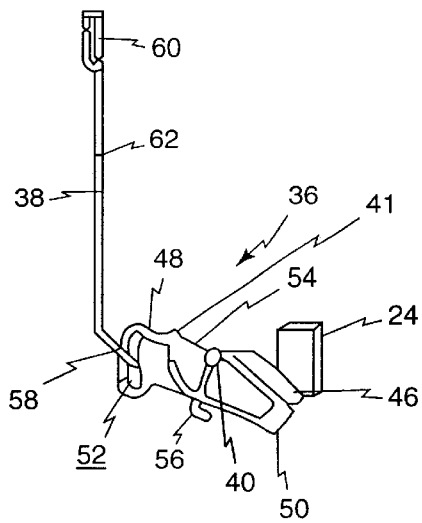
FIG. 3 is a front, perspective view of the cam follower and locking arm in isolation.

FIG. 3 is a front, perspective view of cam follower 36 and locking arm 38 in isolation. Cam follower 36 is a rigid piece constructed of plastic having a cover locking end 46 and a locking arm end 48. Cover locking end 46 comprises a lip 50 for engaging cover 14, which is described in more detail in FIGS. 8 through 10. Locking tab 24 is connected and extends upwardly approximate locking end 46. Locking arm end 48 forms a slot 52 for movably attaching arm 38. Cam follower 36 further includes a top concave section 54 and an engagement nodule 41. As shown in more detail in FIGS. 8 through 10, nodule 41 contacts cam 34 and concave section 54 provides clearance between cam 54 and cam follower 36. Extending from a bottom portion of cam follower 36 is a spring hook 56.

Figure 6:
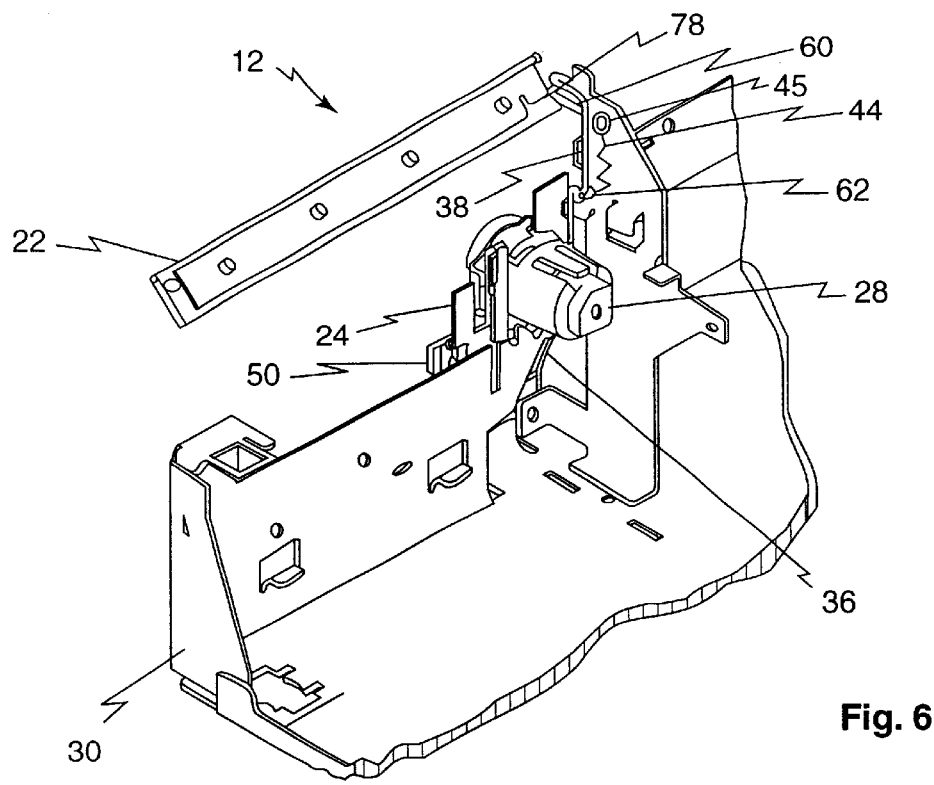
FIG. 6 is a partial, rear view of the locking device utilizing a bezel wall in the fully locked position.
Figure 7:
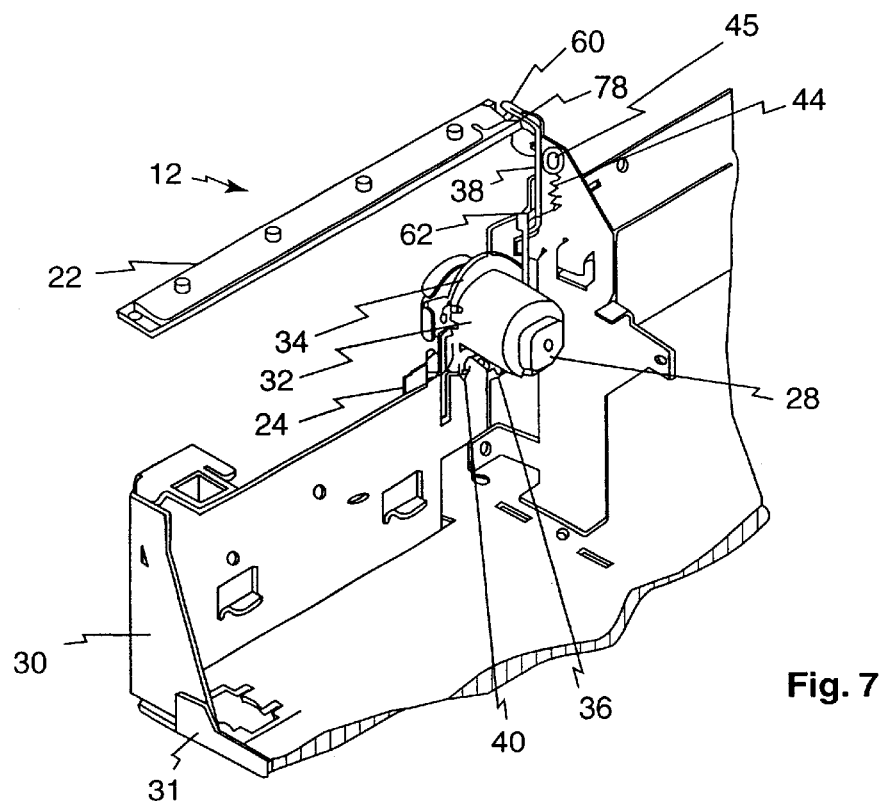
FIG. 7 is a partial, rear view of the locking device utilizing a bezel wall in the cover-only locked position.

Locking arm 38 is an elongated piece, such as wire, having a first follower end 58, a second bezel wall end 60, and at least one substantially horizontal section 62 formed therebetween. Follower end 58 is adapted for connecting to locking arm end 48 of follower 36 and movable along the length of slot 52. Bezel wall end 60 of arm 38 forms a hook adapted for connecting to spline 78 (FIGS. 4, 6, 7).

Figure 4:
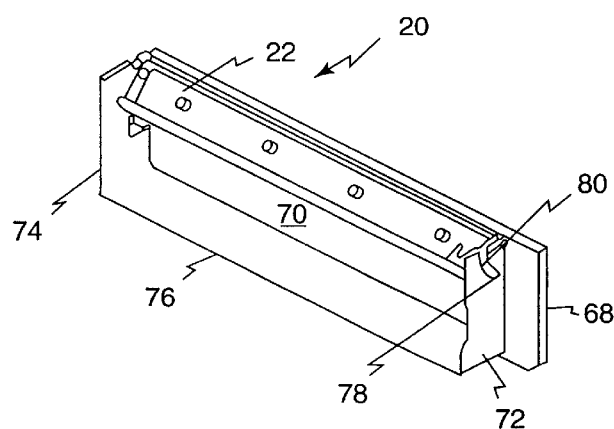
FIG. 4 is a rear, perspective view of the CD-ROM bezel in isolation.

FIG. 4 is a rear, perspective view of the CD-ROM bezel 20 in isolation. CD-ROM bezel 20 includes a substantially rectangular face 68 forming an open window 70 through which CD-ROM 16 (FIG. 1) may be accessed. Extending from face 68 toward the interior of computer 10 (FIG. 1) is a pair of side walls 72, 74, a bottom wall 76, and top bezel wall 22. Bezel wall 22 is hingedly connected between side walls 72 and 74, and has a spline 78 extending from one end thereof. Spline 78 is disposed in and extends through track 80 formed in wall 72 and is connectable to bezel wall end 60 of locking arm 38.

Referring back to FIG. 2, locking device 12 is in the fully unlocked position. In this position cam 34 is in contact with cam follower 36 urging cover locking end 46 and tab 24 downward and locking arm 38 and bezel wall 22 upward. In the fully unlocked position, bezel wall 22 is in a substantially horizontal position and tab 24 is lowered to a position to allow access to drive 18.

Spring 42 is connected between chassis 30 and spring hook 56 (FIG. 3) to aide in maintaining contact between cam follower 36 and cam 34. Additionally, a spring 44 is connected between the substantial horizontal section 62 of arm 38 and a hook 45 (FIG. 6) connected to chassis 30. Spring 44 urges arm 38 upward and into the unlocked position.

Figure 5:
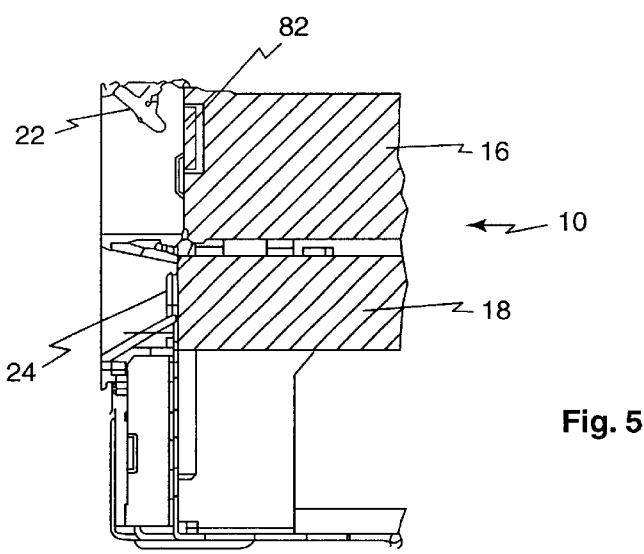
FIG. 5 is a partial, cross-sectional view of the computer showing access to the data drives being blocked.

FIG. 5 is a partial, cross-sectional view of computer 10 showing access to data drives 16 and 18 being blocked. In this figure, bezel wall 22 is lowered preventing the opening of CD-ROM drive door 82. Additionally, locking tab 24 is in the raised position preventing access to disk drive 18.

FIG. 6 is a partial, rear view of locking device 12 utilizing bezel wall 22, in the fully locked position. As shown, lock plug 28 and cam follower 36 are connected to chassis 30. Locking arm 38 extends upward along a portion of chassis 30 and bezel wall end 60 is connected to spline 78 of bezel wall 22. Spring 44 is in tension when locking device 12 is in the fully locked position, and arm 38 and bezel wall 22 are pulled into the down position by cam follower 36. Locking tab 24 is in the raised position and lip 50 can be seen in the cover 14 locking position shown in more detail in FIGS. 8 through 10.

FIG. 7 is a partial, rear view of locking device 12 utilizing bezel wall 22, in the cover-only locked position. In this position lock housing 32 and cam 34 are rotated pivoting cam follower 36 so that locking arm 38 is raised moving bezel wall 22 to the open position. When cam follower 36 is rotated tab 24 is lowered allowing access to disk drive 18 (FIGS. 1 and 5). With additional reference to FIG. 3, when locking device 12 is in the cover-only locked position follower end 58 of arm 38 is positioned within slot 52 and spaced from an end of slot 52. This additional slot space allows for movement of cam follower 36 from the cover-only locked position to the fully unlocked position.

Figure 8:
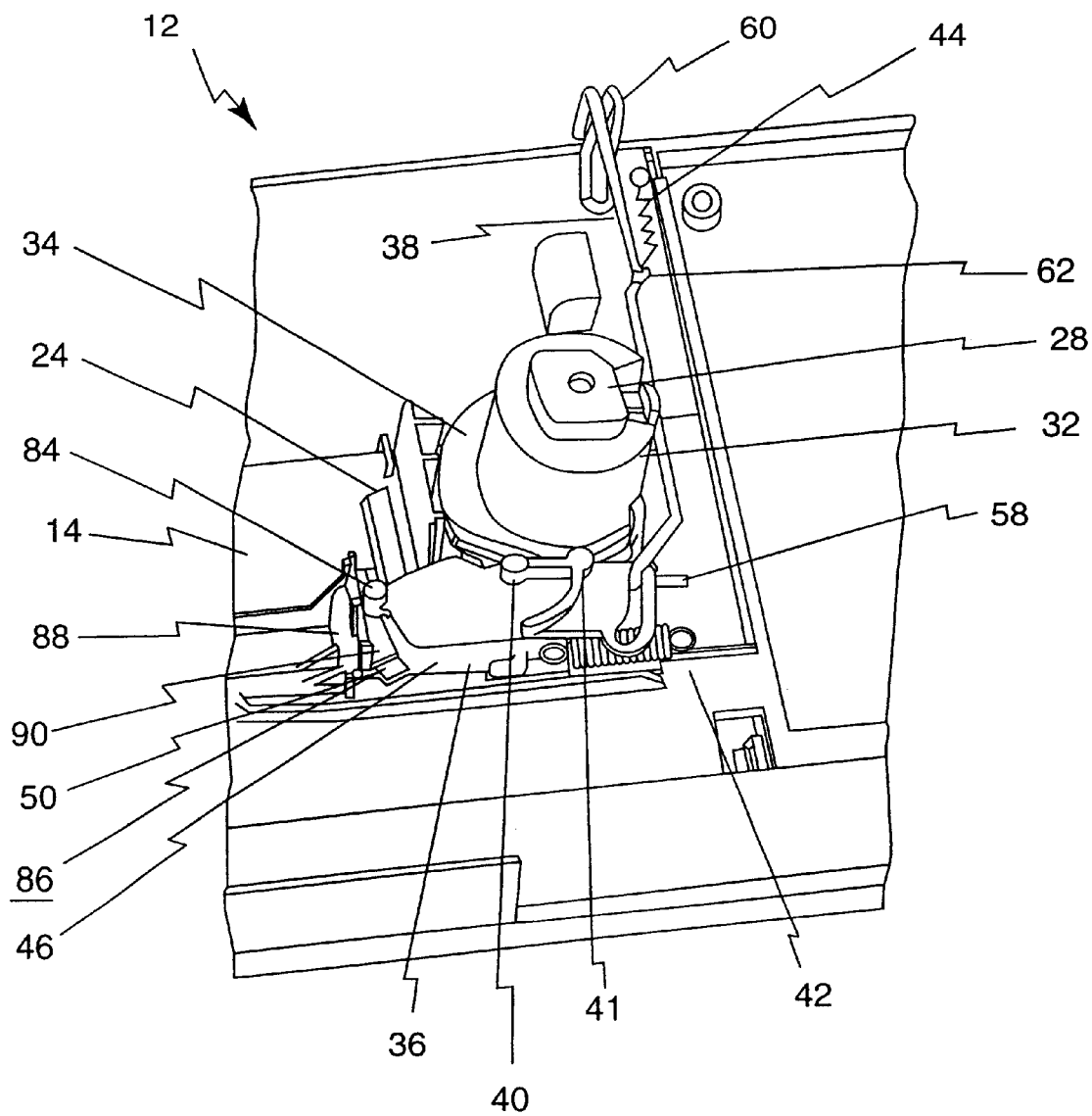
FIG. 8 is a rear view of the locking device utilizing a bezel wall and the cover with the locking device in the cover-only locked position, in isolation.

FIG. 8 is a rear view of locking device 12 and cover 14 in the cover-only locked position, in isolation. In the cover-only locked position, lock plug 28 and cam 34 are rotated so that cam follower 36 is in the middle position wherein locking arm 38 is urged to the raised position via spring 44 (see FIG. 7), and cover locking end 46 is positioned so as to lock cover 14 in place and maintain locking tab 24 in a position removed from disk drive 18 (FIGS. 1 and 5).

Cover 14 is locked in place by entrapping a portion of cover 14 with cover locking end 46 of cam follower 36. Cover locking end 46 has a lip 50 extending therefrom and a retaining leg 84 which form a groove 86. Retaining leg 84 is offset from lip 50. Extending from the interior surface of cover 14 is a protrusion 88 having a ledge 90 extending substantially parallel to cover 14. When locking device 12 is in one of the two positions locking cover 14 in place, ledge 90 is at least partially disposed within groove 86 formed between lip 50 and retaining leg 84.

Figure 9:
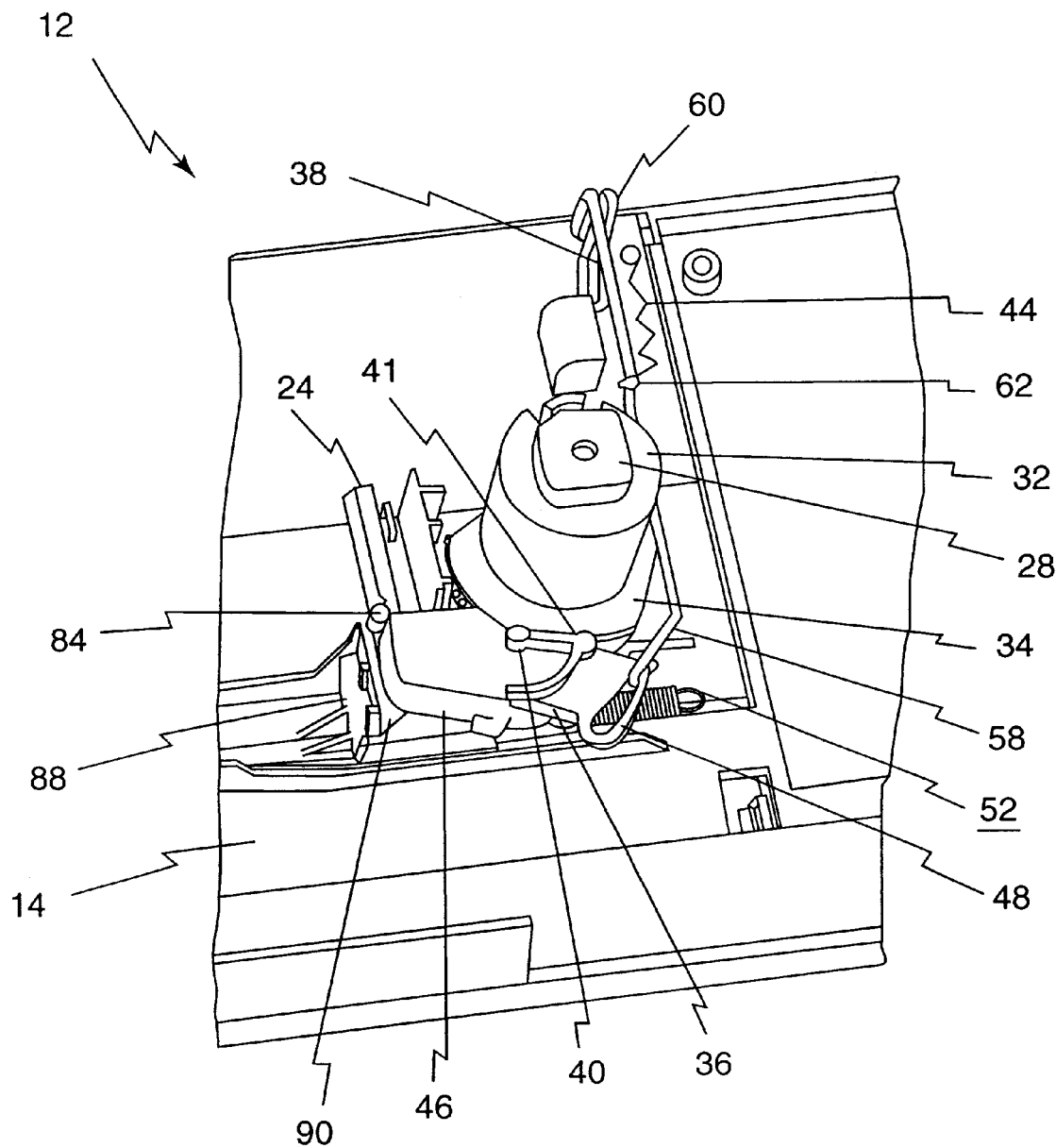
FIG. 9 is a rear view of the locking device utilizing a bezel wall and the cover with the locking device in the fully locked position, in isolation.

FIG. 9 is a rear view of locking device 12 and cover 14 in the fully locked position, in isolation. As shown, lock plug 28 and cam 34 are rotated, cam 34 contacting cam follower 36 thus rotating cam follower 36 about pivot pin 40 raising cover locking end 46 and lowering arm end 48. When cover locking end 46 is in the raised position, tab 24 is positioned to prevent access to disk drive 18 (FIGS. 1, 5, 6) and ledge 90 is disposed between retaining leg 84 and lip 50. When locking arm end 48 is in the lowered position locking arm 38 is urged downward moving bezel wall 22 into a locking position preventing access to CD-ROM 16 (FIGS. 1, 5, 6).

Figure 10:
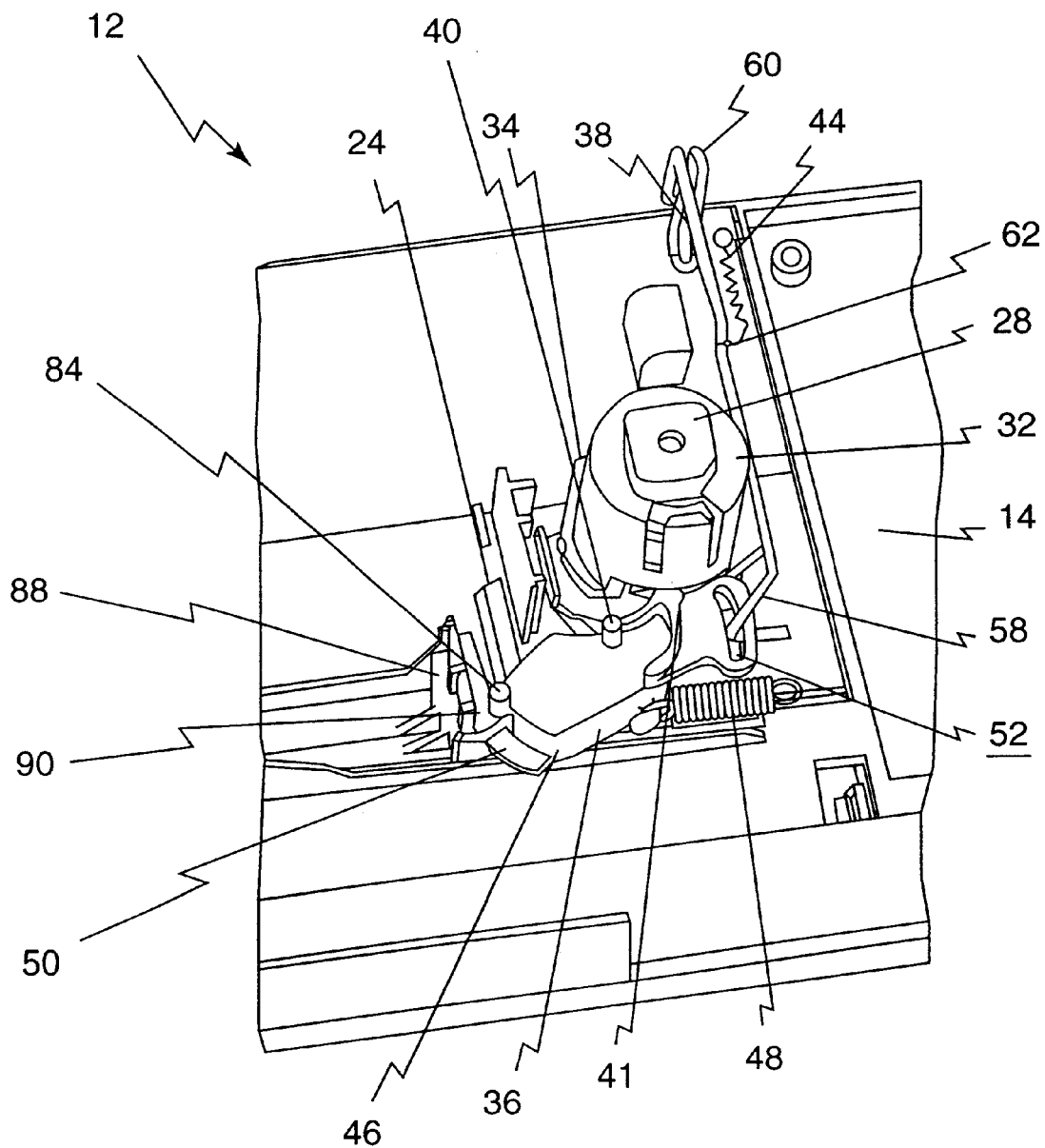
FIG. 10 is a rear view of the locking device utilizing a bezel wall and the cover with the locking device in the fully unlocked position, in isolation.

FIG. 10 is a rear view of locking device 12 and cover 14 in the fully unlocked position, in isolation. In the fully unlocked position lock plug 28 and cam 34 are rotated so that locking arm end 48 of cam follower 36 is raised and cover locking end 46 is lowered. When arm end 48 is in the raised position follower end 58 is allowed to slip in slot 52 and arm 38 is maintained in the open position by spring 44 (FIG. 7). When cover locking end 46 is in the fully lowered position, tab 24 is moved from obstructing disk drive 18 (FIGS. 1, 5, 6) and lip 50 is moved past ledge 90 allowing cover 30 to be pulled away from locking device 12 and removed.

Use of the locking device utilizing a bezel wall of the present invention is now described with reference to FIGS. 1 through 10. A computer 10 having internal components such as processors, microprocessors and a power source are connected within a chassis 30, at least two data drives such as a CD-ROM drive 16 and a floppy drive 18 are also connected to chassis 30 so as to be accessible from outside of computer 10. A lock plug 28 having a rotatable housing 32 carrying a cam 34 is connected to chassis 30 so that key lock 28 may be operated from the exterior of computer 10. Pivotedly connected to chassis 30 is a cam follower 36 which is in operational connection with cam 32, in a manner such that as cam 32 is rotated cam follower 36 pivots raising and lowering a locking arm end 48 and cover locking end 46. Locking arm 38 is movably connected to locking arm end 46 of cam follower 36.

A CD-ROM bezel 20 is connected to chassis 30 approximate CD-ROM 16. Bezel 20 has a pair of side walls 72, 74, a bottom wall 76, and a top bezel wall 22 hinged connected between side walls 72 and 74. Bezel wall 22 further includes a spline 78 extending from one side and disposed within a track 80 formed by side wall 72. One end 60 of arm 38 is connected to spline 78. A spring 44 is connected between arm 38 and chassis 30 so as to urge arm 38 into a position tending to maintain bezel wall 22 substantially perpendicular to side walls 72, 74.

A cover 14 is provided to substantially enclose chassis 30 and the internal components. Cover 30 includes a protrusion 88 and ledge 90 extending from an interior portion thereof. Ledge 90 is position so as to be engageable by cam follower 36 in a manner such that cover 14 may be lockably secured to chassis 30.

Lock plug 28 is a key lock which is rotatable between a fully locked position, a cover-only locked position, and a fully unlocked position. In the cover-only locked position, lock plug 28 is rotated so that cam follower 36 is in a middle position wherein arm 38 is raised by spring 44 maintaining bezel wall 22 substantially parallel to side walls 72, 74 allowing an operator to access CD-ROM 16. Cover lock end 46 having a retaining leg 84, a lip 50, and a locking tap 24 is positioned so that cover ledge 90 is positioned between leg 84 and lip 50 locking cover 14 in place and locking tap 24 is position below the access to disk drive 18. In another embodiment, locking tab 24 may be movably connected to cover 14 or chassis 30 so as to be contacted by cam follower 36 and moved into a position blocking the access to disk drive 18.

In the fully locked position, lock plug 28 is rotated rotating cam 34 which contacts and rotates cam follower 36 so that locking arm end 48 is lowered and cover locking end 46 is raised. When locking arm end 48 is fully lowered arm 38 is lowered moving bezel wall 22 from the substantially horizontal position to a position blocking CD-ROM door 82 preventing removal or insertion of media into CD-ROM 16. With cover locking end 46 in the fully raised position tab 24 is moved to a position blocking access to disk drive 18, and cover ledge 90 remains disposed between retaining leg 84 and lip 50.

In the fully unlocked position, lock plug 28 is rotated rotating cam 34 and moving cover locking end 46 to a lowered position and raising locking arm end 48. In this position spring 44 raises arm 38 and bezel wall 22 so that bezel wall 22 is in a substantial horizontal position allowing access to CD-ROM 16. As cam 34 and cam follower 36 are rotated, tab 24 is lowered from the position blocking disk drive 18. To unlock cover 14, cover locking end 46 is lowered so that lip 50 passes ledge 90 allowing the cover to be removed.

Although the present invention and its advantages have been described in detail, it should be understood that various changes, substitutions and alterations can be made herein without departing from the spirit and scope of the invention as defined by the appended claims.

What is claimed is:

1. A computer cover and data drive locking device utilizing a bezel wall, comprising:

an actuatable lock connected to a computer chassis having a cam connected thereto;

a bezel surrounding at least a portion of a first data drive mechanism which is connected to a processor, said bezel having a movable wall;

a cover; and a cam follower movably connected to said chassis so as to be in functional connection with said cam, said cam follower having a first end connected to said movable wall and a second end connectable to said cover;

wherein said lock is movable between a position interconnecting said cover to said chassis via said cam follower second end, a position interconnecting said cover and said chassis and disposing said movable wall into a position preventing access to said first data drive, and a position where said cam follower second end is disconnected from said cover and said movable wall is disposed away from the access to said first data drive.

2. The locking device of claim 1, further including:

a connecting arm connected between said first end of said cam follower and said movable bezel wall.

3. The locking device of claim 1, further including:

a protrusion extending from an interior surface of said cover; and said second end of said cam having a locking surface for engaging said protrusion when said lock is in at least two positions for securing said cover to said chassis.

4. The locking device of claim 2, further including:

a tensioning member in connection between said arm and said chassis in a manner such that said movable bezel wall is urged to a position removed from the access to said first data drive.

5. The locking device of claim 2, further including:

a slot formed by said first end of said cam follower wherein a portion of said arm may slip as said cam follower is positioned.

6. The locking device of claim 2, further including:

a protrusion extending from an interior surface of said cover; and said second end of said cam having a locking surface for engaging said protrusion when said lock is in at least two positions for securing said cover to said chassis.

7. The locking device of claim 4, further including:

a slot formed by said first end of said cam follower wherein a portion of said arm may slip as said cam follower is positioned.

8. The locking device of claim 4, further including:

a protrusion extending from an interior surface of said cover; and said second end of said cam having a locking surface for engaging said protrusion when said lock is in at least two positions for securing said cover to said chassis.

9. The locking device of claim 7, further including:

a protrusion extending from an interior surface of said cover; and said second end of said cam having a locking surface for engaging said protrusion when said lock is in at least two positions for securing said cover to said chassis.

10. A computer cover and data drive locking device utilizing a bezel wall, comprising:

an actuatable lock connected to a computer chassis having a cam connected thereto;

a bezel surrounding at least a portion of a first data drive mechanism coupled to a processor, said bezel having a movable wall;

a second data drive mechanism coupled to a processor;

a cover;

a cam follower movably connected to said chassis so as to be in functional connection with said cam, said cam follower having a first end connected to said movable wall and a second end connectable to said cover; and a locking tab connected to said second end;

wherein said lock is movable between a position interconnecting said cover to said chassis via said cam follower second end, a position interconnecting said cover and said chassis and disposing said movable wall into a position preventing access to said first data drive and said locking tab into a position preventing access to said second data drive, and a position where said cam follower second end is disconnected from said cover and said movable wall is disposed away from the access to said first data drive.

11. The locking device of claim 10, further including:

a connecting arm connected between said first end of said cam follower and said movable bezel wall.

12. The locking device of claim 10, further including:

a protrusion extending from an interior surface of said cover; and said second end of said cam having a locking surface for engaging said protrusion when said lock is in at least two positions for securing said cover to said chassis.

13. The locking device of claim 11, further including:
a tensioning member in connection between said arm and said chassis in a manner such that said movable bezel wall is urged to a position removed from the access to said first data drive.

14. The locking device of claim 13, further including:
a slot formed by said first end of said cam follower wherein a portion of said arm may slip as said cam follower is positioned.

15. The locking device of claim 13, further including:
a protrusion extending from an interior surface of said cover; and
said second end of said cam having a locking surface for engaging said protrusion when said lock is in at least two positions for securing said cover to said chassis.

16. The locking device of claim 14, further including:
a protrusion extending from an interior surface of said cover; and
said second end of said cam having a locking surface for engaging said protrusion when said lock is in at least two positions for securing said cover to said chassis.

17. A computer comprising:
a processor;
a first data drive mechanism coupled to a processor;
a second data drive mechanism coupled to the processor;
a chassis for enclosing the processor and said first and said second data drive mechanisms; and
a locking mechanism connected to said chassis having a cover and movable between a first position locking said cover and said data drive mechanisms preventing physical and electronic access to said data drive mechanisms, a second position permitting electronic access to said data drive mechanisms and preventing physical access thereto, and a third position permitting physical and electronic access to said data drive mechanisms.

18. The computer of claim 17, wherein:
said locking mechanism includes a lock plug having a cam connected to said chassis;
a bezel surrounding at least a portion of said first data drive having a movable wall;
a cam follower movably connected to the chassis so as to be in functional connection with said cam, said cam follower having a first end connected to said movable bezel wall and a second end connectable to said cover; and
a locking tab connected to said second end of said cam follower.

19. The locking device of claim 18, further including:
a connecting arm connected between said first end of said cam follower and said movable bezel wall.

20. The locking device of claim 18, further including:
a protrusion extending from an interior surface of said cover; and
said second end of said cam having a locking surface for engaging said protrusion when said lock is in at least two positions for securing said cover to said chassis.

21. The locking device of claim 19, further including:
a tensioning member in connection between said arm and said chassis in a manner such that said movable bezel wall is urged to a position removed from the access to said first data drive.

22. The locking device of claim 19, further including:
a protrusion extending from an interior surface of said cover; and
said second end of said cam having a locking surface for engaging said protrusion when said lock is in at least two positions for securing said cover to said chassis.

23. The locking device of claim 21, further including:
a slot formed by said first end of said cam follower wherein a portion of said arm may slip as said cam follower is positioned.

24. The locking device of claim 21, further including:
a protrusion extending from an interior surface of said cover; and
said second end of said cam having a locking surface for engaging said protrusion when said lock is in at least two positions for securing said cover to said chassis.

25. A method for selectively limiting physical and electronic access to data drives of computer having a processor, a first and a second data drive mechanism coupled to the processor, and a chassis for enclosing the processor and first and second data drive mechanism, the method comprising the steps of:
connecting a locking mechanism to an electronic chassis of a computer having a cover;
rotating said lock between a first position locking said cover and a first and second data drive mechanism preventing physical and electronic access to said data drive mechanisms, a second position permitting electronic access to said data drive mechanisms and preventing physical access thereto, and a third position permitting physical and electronic access to said data drive mechanisms.

26. The method of claim 25, wherein:
said locking apparatus comprising:
an actuatable lock connected to a computer chassis having a cam connected thereto;
a bezel surrounding at least a portion of a first data drive mechanism connected to a processor, said bezel having a movable wall;
a cover a protrusion extending from an internal surface thereof;
a cam follower movably connected to said chassis so as to be in functional connection with said cam, said cam follower having a first end, and a second end having a locking surface adapted for engaging said cover protrusion;
a locking tab extending from said second end of said cam follower;
a connecting arm having a first end connected to said first end of said cam follower and a second end connected to said movable bezel wall; and
a tensioning member in connection between said arm and said chassis in a manner such that said movable bezel wall is urged to a position removed from the access to said first data drive.

27. The method of claim 26, wherein:
said locking apparatus is in a cover-only locked position when said lock is rotated so that said movable bezel wall is in a position allowing access to said first data drive, and said second cam follower end is in a position such that said locking surface engages said cover protrusion in a manner limiting removal of said cover from the chassis and said locking tab is moved to a position unobstructive of access to said second data drive;
said locking apparatus is in a fully locked position when said lock is rotated so that said first end of said cam follower via said connecting arm moves said movable bezel wall into a position obstructing access to said first data drive, and said second cam follower end is in a position such that said locking surface engages said cover protrusion in a manner limiting removal of said cover from the chassis and said tab is moved to a position obstructing access to said second data drive; and said locking apparatus is in a fully unlocked position when said lock is rotated so that said first cam follower end is a position such that said movable bezel wall is in a position allowing access to said first data drive, and said second cam follower end is moved to a position such that said locking surface is not in functional engagement with said cover protrusion and said locking tab is moved to a position unobstructive of access to said second data drive.

28. A method for selectively securing a cover to an electronic chassis in combination with limiting access to at least one data drive utilizing a bezel wall, the method comprising the steps of:

coupling a locking apparatus into a computer, the locking apparatus comprising:

an actuatable lock connected to a computer chassis having a cam connected thereto;

a bezel surrounding at least a portion of a first data drive mechanism connected to a processor, said bezel having a movable wall;

a cover a protrusion extending from an internal surface thereof;

a cam follower movably connected to said chassis so as to be in functional connection with said cam, said cam follower having a first end, and a second end having a locking surface adapted for engaging said cover protrusion;

a connecting arm having a first end connected to said first end of said cam follower and a second end connected to said movable bezel wall; and a tensioning member in connection between said arm and said chassis in a manner such that said movable bezel wall is urged to a position removed from the access to said first data drive; and rotating said lock to a position wherein said cover-only is secured to said chassis, or wherein said cover is secured to said chassis and access to said first data drive is limited, or wherein said cover may be removed from said chassis and access to said first data drive is permitted.

29. The method of claim 28, wherein:

said locking apparatus is in a cover-only locked position when said lock is rotated so that said movable bezel wall is in a position allowing access to said first data drive, and said second cam follower end is in a position such that said locking surface engages said cover protrusion in a manner limiting removal of said cover from the chassis;

said locking apparatus is in a fully locked position when said lock is rotated so that said first end of said cam follower via said connecting arm moves said movable bezel wall into a position preventing access to said first data drive, and said second cam follower end is in a position such that said locking surface engages said cover protrusion in a manner limiting removal of said cover from the chassis; and said locking apparatus is in a fully unlocked position when said lock is rotated so that said first cam follower end is a position such that said movable bezel wall is in a position allowing access to said first data drive, and said second cam follower end is moved to a position such that said locking surface is not in functional engagement with said cover protrusion.

30. The method of claim 28, wherein:

said locking apparatus further includes a tab extending from said second end of said cam follower movable to a position limiting access to a second data drive in connection with the processor.

31. The method of claim 30, wherein:

said locking apparatus is in a cover-only locked position when said lock is rotated so that said movable bezel wall is in a position allowing access to said first data drive, and said second cam follower end is in a position such that said locking surface engages said cover protrusion in a manner limiting removal of said cover from the chassis and said locking tab is moved to a position unobstructive of access to said second data drive;

said locking apparatus is in a fully locked position when said lock is rotated so that said first end of said cam follower via said connecting arm moves said movable bezel wall into a position obstructing access to said first data drive, and said second cam follower end is in a position such that said locking surface engages said cover protrusion in a manner limiting removal of said cover from the chassis and said tab is moved to a position obstructing access to said second data drive; and said locking apparatus is in a fully unlocked position when said lock is rotated so that said first cam follower end is a position such that said movable bezel wall is in a position allowing access to said first data drive, and said second cam follower end is moved to a position such that said locking surface is not in functional engagement with said cover protrusion and said locking tab is moved to a position unobstructive of access to said second data drive.

* * * * *